July 23, 1940.   R. VOGT   2,209,144
CONTROL GEAR
Filed June 14, 1939   2 Sheets-Sheet 2
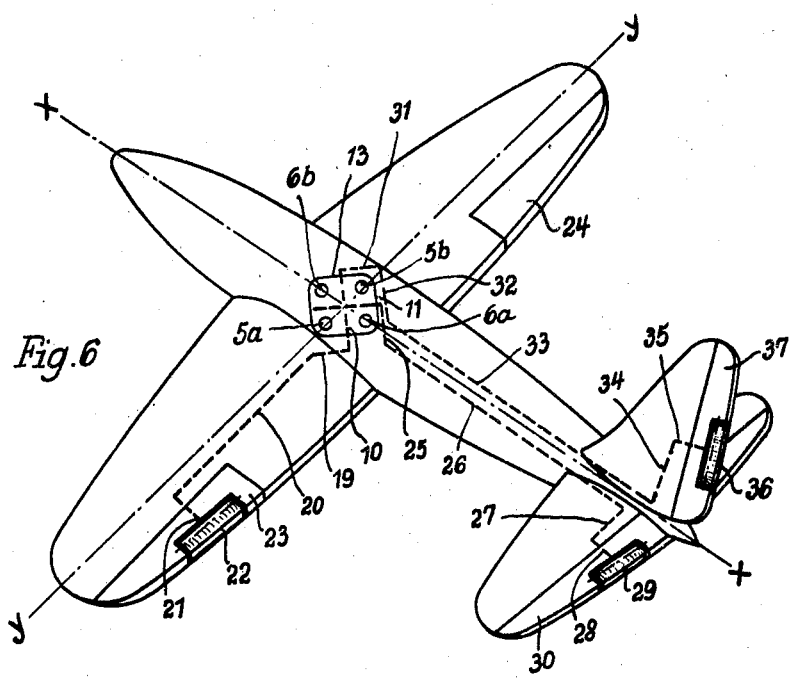
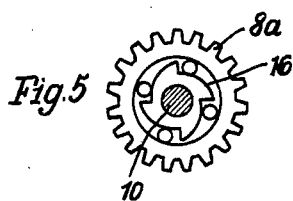
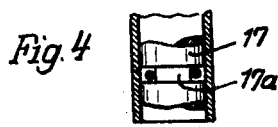
Inventor:
R. Vogt
By: Glascock Downing & Seebold
ATTYS.

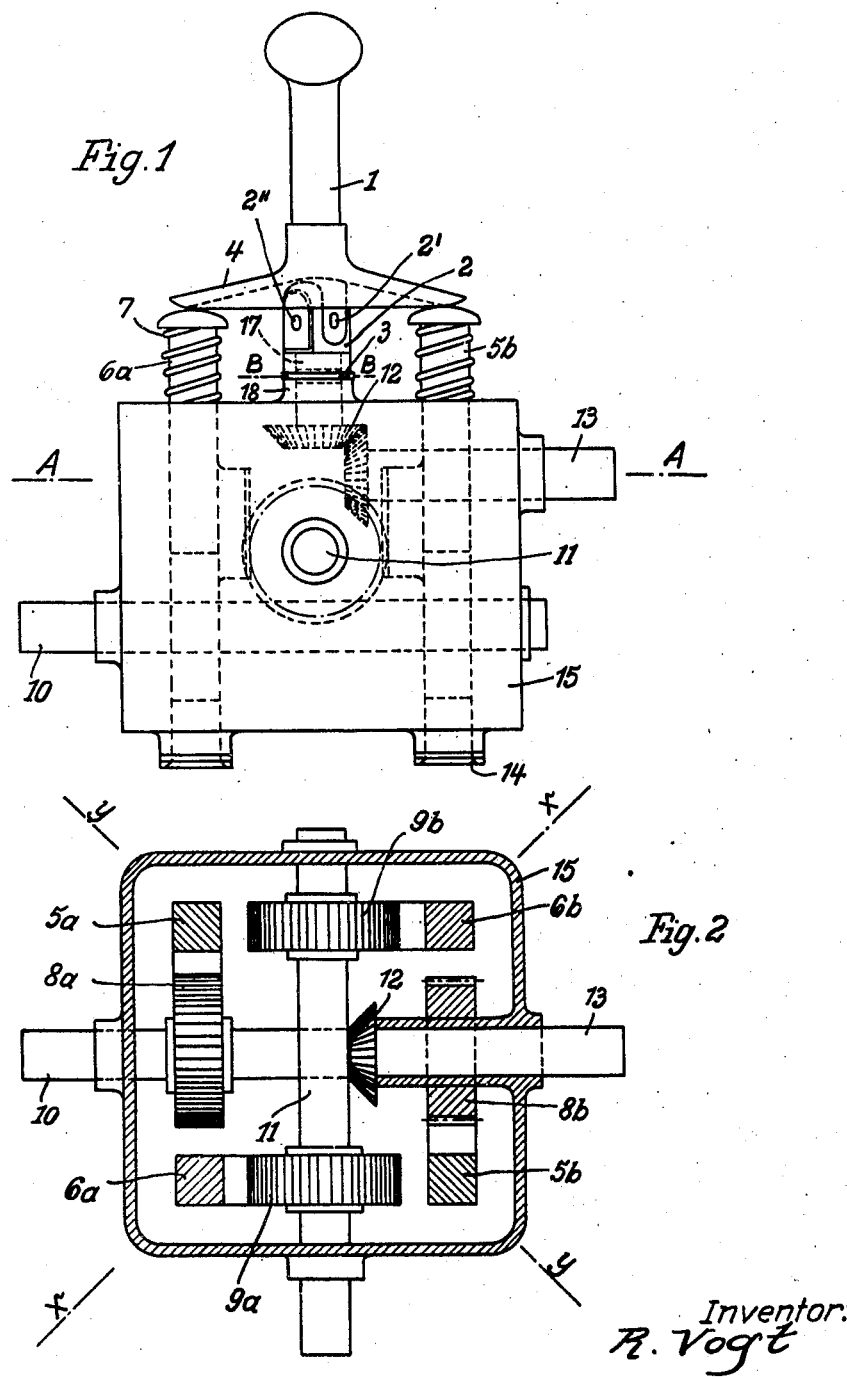

Patented July 23, 1940

2,209,144

UNITED STATES PATENT OFFICE 2,209,144

CONTROL GEAR

Richard Vogt, Hamburg, Germany

Application June 14, 1939, Serial No. 279,213
In Germany March 8, 1938

10 Claims. (Cl. 244—83)

This invention relates to a gear system for operation of the trimming means of aircraft from a common trimmer control stick.

It is an object of the present invention to provide means for effecting the trimming of aircraft in a simple, efficient and accurate manner.

A further particular object of the present invention is to provide means for operating the trimming means very slowly, but with a sufficiently large adjusting range for the trimming of the aircraft with respect to its three different axes, viz., vertical, longitudinal and transverse axes.

Another object of the invention is to provide means for enabling a large adjusting range together with slow motion adjustment by movement of a control stick in the same direction in which a trimming action is desired.

Still another object of the invention is to effect such trimming with respect to any of the said axes absolutely independently from the adjustment of the remaining two trimming means, and without any disturbance of the balance or adjustment with respect to the respective remaining axes of the aircraft.

With these and other objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which—

Fig. 1 is a side elevation of a control system having the invention applied thereto.

Fig. 2 is a horizontal section on line A—A of Fig. 1.

Fig. 3 is a fragmentary section on line B—B of Fig. 1.

Fig. 4 is a fragmentary section on line C—C of Fig. 3.

Fig. 5 is a detail.

Fig. 6 is a schematical perspective view, showing by way of example the arrangement of my novel control system in an aircraft.

Similar reference numerals denote similar parts in the different views.

Referring now to the drawings in greater detail, and first to Figs. 1 to 5, it will be seen that the control stick 1 is swingable in two directions at right angles to each other, about a cross-pin Cardan joint 2. The cross pins are shown at 2' and 2", but for the rest, the Cardan joint has been shown schematically only, since suitable constructions of Cardan joints are well known in the art. Connected to the lower side of the Cardan joint is a shaft 17 which is mounted for rotation in a projection 18 of the gear casing 15 and has a rectangular portion 17a, Fig. 3. A U-shaped spring 3 passed through a slot in the projection 18 by engagement with said portion 17a permits quarter rotations of the shaft 17 only. Thus, the control stick can be rocked about two definite axes x—x and y—y only which are diagonally directed with respect to the casing 15. On rocking the stick about one of said axes, its flange 4 depresses one of the four racks 5a, 5b, 6a, or 6b, respectively, against action of the respective return springs 7. End washers 14 on the lower ends of the racks prevent rising of the same beyond the position indicated in Fig. 1.

The cooperating racks 5a and 5b form one pair of racks and intermesh with a pair of gear wheels 8a and 8b, respectively, which are mounted on a common shaft 10 while the racks 6a and 6b form the other pair of racks and intermesh with a pair of gear wheels 9a and 9b, respectively, which are mounted on a common shaft 11. The shafts 10 and 11 are mounted crosswise for rotation in the gear casing 15, the shaft 11 being arranged above the shaft 10.

Interposed between the gear wheels and their seating surfaces on the respective shaft are single-way driving devices, for example, of the type known as "freewheel" device in bicycles and the like, as shown at 16 in Fig. 5, for transmitting rotating movements in one direction only from the gear wheels to the shafts. The said freewheel devices are well known in the art and, therefore, have been shown purely schematically only in the drawings.

The freewheel devices are so arranged that a driving connection is established only in case of a depression of the associated rack, while in the return motion of the respective rack, to its normal position shown in Fig. 1, the associated gear wheel rotates idly.

It will thus be understood that when the control stick is rocked about the axis x—x, i. e., in case of the position shown in Fig. 1, about the pin 2", the flange 4 will depress either the rack 5a or the rack 5b, depending on the rocking direction, and cause rotation of the associated wheel 8a or 8b, respectively. Accordingly, the shaft 10 is rotated ratchet-fashion in either direction.

On the other hand, when the control stick is rocked about the axis y—y, i. e., in case of the position shown in Fig. 1, about the pin 2', either the rack 6a or the rack 6b is depressed and the shaft 11 is rotated ratchet-fashion in either direction, through the freewheel gear 9a or 9b, respectively.

Furthermore, by rotation of the control stick 1 about its own axis, the shaft 13 can be rotated, through the bevel wheels 12 and 12' which are fast on the shafts 17 and 13, respectively. Of course, the said rotations can be effected in the form of quarter steps only, due to the action of the spring 3.

Referring now to Fig. 6, it will be seen that the gear system is mounted with its diagonal axes x—x and y—y parallel to the longitudinal and transverse axes of the aircraft.

The shaft 10 of the gear is connected, through conventional transmission members comprising, for instance, shafts and/or rods 19, 20, 21, indicated in dotted lines, with an adjustable trimming surface 22 forming part of one of the two ailerons 23 and 24. The shaft 11 of the gear in turn is connected, through connecting members, comprising, for instance, shafts and/or rods 25, 26, 27, 28, with a trimming surface 29 forming part of one of the elevators 30. Furthermore, the shaft 13 is connected, through connecting members, comprising, for instance, shafts and/or rods 31, 32, 33, 34, 35, with a trimming surface 36 forming part of the rudder 37. Transmissions for operating said trimming surfaces from shafts arranged in the pilot's seat are well known in the art and, therefore, need not be described here in detail. Of course, suitable mechanisms as known in the art must be provided for transmitting the control movements to the trimming surfaces 22, 29 or 36, respectively, independently from the control movement of the main surfaces 23, 30 or 37, respectively, which are operated from a separate main control stick.

It will thus be clear that rocking of the control stick 1 in a transverse direction, from its middle position to the left, will cause upward swinging of the trimmer aileron 22 and, as a result, a slight anti-clockwise turning of the aircraft about its longitudinal axis, while rocking of the same from its middle position to the right will cause downward swinging of the trimmer aileron 22 and a slight clockwise turning of the aircraft about the longitudinal axis. Again, forward rocking of the control stick from its middle position will cause upward swinging of the trimmer surface 29 and a slight "pushing" effect, while backward rocking cause a slight "pulling" effect. Furthermore, clockwise rotation of the control stick will cause anti-clockwise swinging of the trimmer surface 36 and, as a result, a slight right hand turning tendency of the aircraft, while anti-clockwise rotation of the control stick will have the opposite effect.

It will be noted that due to the special "ratchet type" operation of the gear system the angle through which the respective trimmer surface is swung per unit angular motion of the control stick in the respective direction can be made as small as desired in order to make the regulation sufficiently slow, without reducing the available total range of control motion.

In the embodiment shown in Fig. 6, the gear casing is arranged with its said diagonal axes coinciding with the respective axes of the airplane, but it will be understood that it will be sufficient for an obvious operation of the control stick in accordance with the desired trimming action to arrange the said gear axes parallel to the said axes of the aircraft. On the other hand, where obvious operation is not required or where other trimming effects are desired, the gear system may be arranged in other directions as well.

It will be understood that it is also possible, by suitable application of my novel system, to actuate more than three shafts from a common control organ. Also, it is possible, for this or any other purpose, to provide a prism having more than four faces instead of the square portion 17a of the shaft 17 shown in Fig. 3, in order to permit a swinging motion of the shaft in more than two directions. However, for most practical cases the adjustment of three shafts and the swinging of the control stick in two directions only will be the preferred form.

I am aware that many further changes may be made and numerous details of construction may be varied through a wide range without departing from the principles of this invention, and I, therefore, do not purpose limiting the patent granted hereon otherwise than is necessitated by the prior art.

I claim:

1. In an aircraft, means for trimming the aircraft about its three axes, and a common control mechanism adapted to operate said trimming means and comprising a common control stick mounted for rotation about its center axis and for swinging about two crosswisely arranged axes, means adapted to transmit rotary motion of said control stick to the means for trimming the aircraft about one of said three axes and means for transmitting swinging motion of the control stick away from its normal position to the trimming means only associated to the respective swinging direction while permitting return swing motion of the control stick to said normal position without a corresponding return motion of the respective trimming means.

2. In an aircraft, first, second and third means for trimming the aircraft about its vertical, longitudinal and transverse axes, respectively, a common control mechanism adapted to operate said several trimming means and comprising a common control organ mounted to be rotatable in quarter steps about its center axis and swingable about two axes arranged at right angles to each other and parallel to the longitudinal and transverse axes of the aircraft, respectively, means for transmitting rotary motion of said control organ upon the first trimming means and means for selectively transmitting swinging motion of the control organ away from its normal position to that of the second and third trimming means corresponding to the respective swinging direction while permitting return swing motion of the control organ to said normal position without a corresponding return motion of the respective trimming means.

3. In an aircraft, first, second and third means for trimming the aircraft about its vertical, longitudinal and transverse axes, respectively, a common control mechanism adapted to operate said several trimming means and comprising a common control organ mounted to be rotatable in quarter steps about its center axis and swingable about two axes arranged at right angles to each other and parallel to the longitudinal and transverse axes of the aircraft, respectively, means for transmitting rotary motion of said control organ upon the first trimming means and means for transmitting swinging motion of the control organ about the longitudinally directed axis and away from its normal position to the second trimming means while permitting return motion of the control organ to its normal position without a corresponding return motion of said second trimming means and further means for transmitting swinging motion of the control organ about the transversely directed axis and away from its normal position to the third trimming means while permitting return swing motion of the control organ to its normal position without a corresponding return motion of said third trimming means.

4. In an aircraft, first, second and third means for trimming the aircraft about its vertical, longitudinal and transverse axes, respectively, a common control mechanism adapted to operate said several trimming means and comprising a common control organ mounted to be rotatable in quarter steps about its center axis and swingable about two axes arranged at right angles to each other and parallel to the longitudinal and transverse axes of the aircraft, respectively, means for transmitting rotary motion of said control organ upon the first trimming means and means including a ratchet mechanism for selectively transmitting swinging motion of the control organ away from its normal position to that of the second and third trimming means corresponding to the respective swinging direction while permitting return swing motion of the control organ to said normal position without a corresponding return motion of the respective trimming means.

5. In an aircraft, first, second and third means for trimming the aircraft about its vertical, longitudinal and transverse axes, respectively, a common control mechanism adapted to operate said several trimming means and comprising a common control organ mounted to be rotatable in quarter steps about its center axis and swingable about two axes arranged at right angles to each other and parallel to the longitudinal and transverse axes of the aircraft, respectively, means for transmitting rotary motion of said control organ upon the first trimming means and means including a free-motion mechanism for selectively transmitting swinging motion of the control organ away from its normal position to that of the second and third trimming means corresponding to the respective swinging direction while permitting return swing motion of the control organ to said normal position without a corresponding return motion of the respective trimming means.

6. In an aircraft, first, second and third means for trimming the aircraft about its vertical, longitudinal and transverse axes, respectively, a common control mechanism adapted to operate said several trimming means and comprising a rotatably mounted cross-pin Cardan joint, a common control stick mounted on said Cardan joint, means for transmitting rotary motion of said control stick upon the first trimming means and means for selectively transmitting swinging motion of the control stick away from its normal position to that of the second and third trimming means corresponding to the respective swinging direction while permitting return swing motion of the control stick to said normal position without a corresponding return motion of the respective trimming means.

7. In an aircraft, first, second and third means for trimming the aircraft about its vertical, longitudinal and transverse axes, respectively, a common control mechanism adapted to operate said several trimming means and comprising a cross-pin Cardan joint mounted for rotation in quarter steps, a common control stick mounted on said Cardan joint, means for transmitting rotary motion from said control stick and through said Cardan joint to the first trimming means and means including a flange on said control stick, at least two crosswisely arranged pairs of racks adapted to be selectively depressed against spring action by rocking said flange from its normal position, depending on the rocking motion of said control stick, at least two pairs of gear wheels associated to and intermeshing with said pairs of racks and at least two shafts carrying one of said pairs of gear wheels each, and being connected each with its two associated gear wheels by oppositely acting free-motion drives, for selectively transmitting swinging motion of the control stick away from its normal position to that of the second and third trimming means corresponding to the respective swinging direction while permitting return swing motion of the control stick to said normal position without a corresponding return motion of the respective trimming means.

8. In an aircraft, first, second and third means for trimming the aircraft about its vertical, longitudinal and transverse axes, respectively, a common control mechanism adapted to operate said several trimming means and comprising a cross-pin Cardan joint including spring means engaging a portion of rectangular cross section for permitting rotation of said Cardan joint in quarter steps only, a common control stick mounted on said Cardan joint, means for transmitting rotary motion from said control stick and through said Cardan joint to the first trimming means and means including a flange on said control stick, at least two cross-wisely arranged pairs of racks adapted to be selectively depressed against spring action by rocking said flange from its normal position, depending on the rocking motion of said control stick, at least two pairs of gear wheels associated to and intermeshing with said pairs of racks and at least two shafts carrying one of said pairs of gear wheels each, and being connected each with its two associated gear wheels by oppositely acting free-motion drives, for selectively transmitting swinging motion of the control stick away from its normal position to that of the second and third trimming means corresponding to the respective swinging direction while permitting return swing motion of the control stick to said normal position without a corresponding return motion of the respective trimming means.

9. A gear system for transmitting the rotary and rocking motions of an auxiliary control stick to the trimming means of an aircraft comprising first, second and third members for operating the said trimming means, means for transmitting rotary motion of said control stick to said first operating member and means for transmitting swinging motion of the control stick away from its normal position to that of said second and third operating members only associated to the respective swinging direction while permitting return swing motion of the control stick to said normal position without a corresponding return motion of the respective operating member.

10. A gear system for transmitting the rotary and rocking motions of an auxiliary control stick to the trimming means of an aircraft comprising first, second and third members for operating the said trimming means, means for transmitting rotary motion of said control stick to said first operating member and means for transmitting swinging motion of the control stick away from its normal position to that of said second and third operating members only associated to the respective swinging direction while permitting idle return swing motion of the control stick to said normal position.

RICHARD VOGT.